United States Patent [19]

Bishop

[11] Patent Number: 4,702,755
[45] Date of Patent: Oct. 27, 1987

[54] DRIP TRAP

[76] Inventor: Kevin Bishop, 134 Forge Road S. E., Calgary, Alberta T2H 0S8, Canada

[21] Appl. No.: 842,976

[22] Filed: Mar. 24, 1986

[51] Int. Cl.⁴ .............................................. B01D 51/00
[52] U.S. Cl. ................................. 55/418; 55/DIG. 15; 55/215; 137/206
[58] Field of Search ................... 55/55, 167, 168, 189, 55/215, 218, 418, DIG. 15; 137/177, 178, 206; 210/110, 188

[56] References Cited

U.S. PATENT DOCUMENTS

| | | | |
|---|---|---|---|
| 844,958 | 2/1907 | Riggs | 137/178 |
| 2,232,198 | 2/1941 | Ashworth | 137/206 |
| 2,738,802 | 3/1956 | McGillis et al. | 137/206 X |
| 2,970,604 | 2/1961 | Henry | 137/206 |
| 3,460,319 | 8/1969 | Tkach | 55/55 |
| 4,279,269 | 7/1981 | Schink et al. | 137/206 |

Primary Examiner—Charles Hart
Attorney, Agent, or Firm—Harold H. Dutton, Jr.; George H. Dunsmuir

[57] ABSTRACT

A drip trap for separating a liquid from a gas includes a casing, an inlet duct near the top end of the casing for introducing a liquid-containing gas into the casing, a downspout on the inner end of the casing beneath the bottom end of the downspout for discharging liquid from the casing, and a four-way two port valve for connecting either the inlet duct to a gas line for receiving liquid-containing gas, or the outlet duct to a drain for discharging liquid from the casing. The liquid-containing gas is fed into the casing until the liquid rises above the bottom of the downspout to compress gas in the top end of the casing. The valve is rotated to close the inlet duct and open the outlet duct to the drain, whereby liquid is discharged from the casing. The trapped gas provides the driving pressure for discharging the liquid and positive prevention of continuous venting of manifold gas vapors through the trap to atmosphere. The invention further provides a method of lifting the liquid to enable gravity run to sewer line.

3 Claims, 1 Drawing Figure

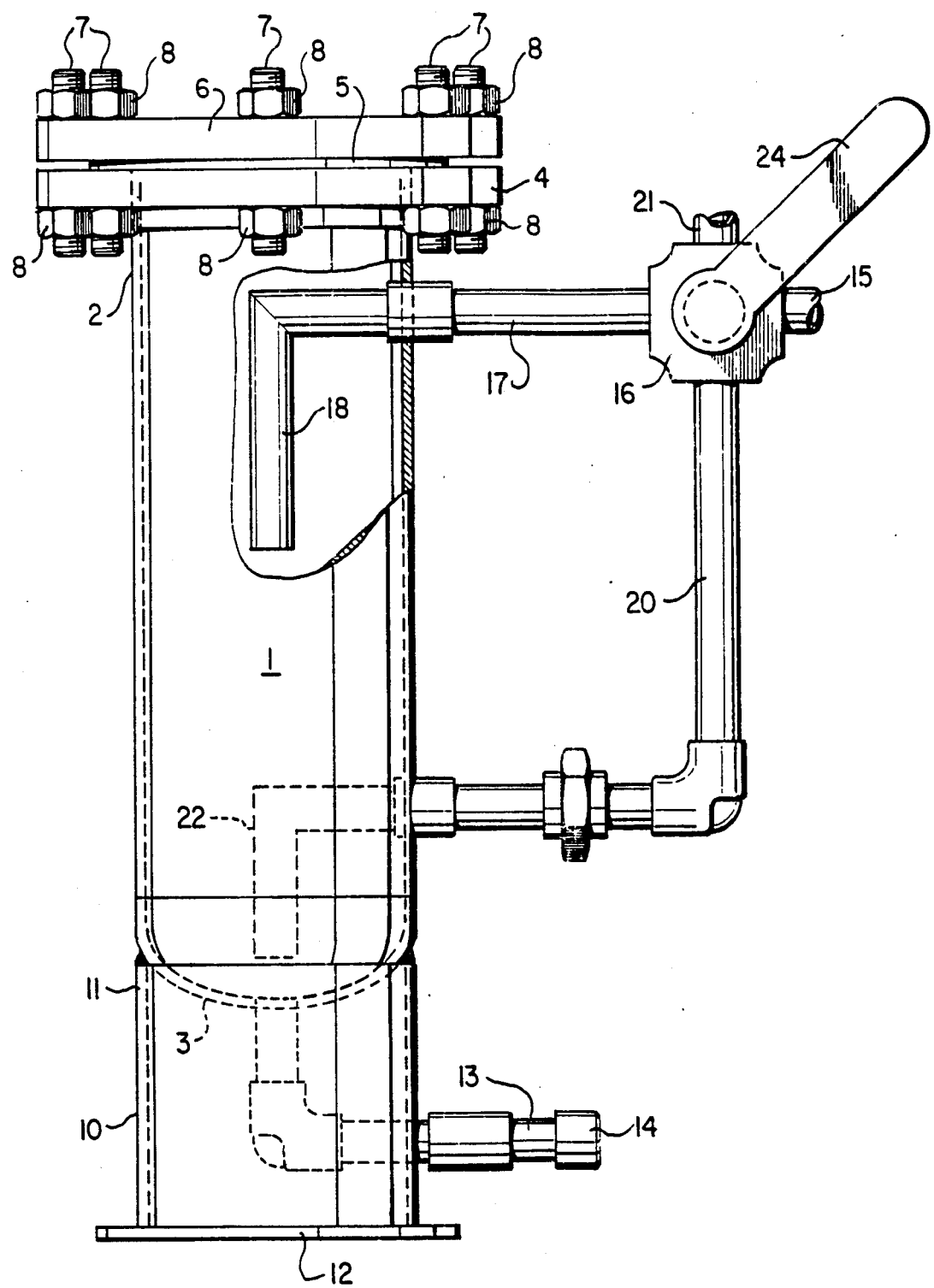

DRIP TRAP

BACKGROUND OF THE INVENTION

This invention relates to a drip trap and in particular to a high pressure drip trap for removing liquids from gas lines.

The device of the present invention can be used indoors or outdoors. The primary outdoor use is in sewage treatment plants. A drip trap must separate liquid from gas while ensuring that gas does not enter and leave the trap simultaneously. This is usually accomplished in conventional gravity operated traps by providing a single control for opening a liquid drain while closing the gas/liquid inlet.

There still exists a need for a drip trap which effectively separates a liquid from a gas. The object of the present invention is to meet such need by providing a relatively simple drip trap which utilizes gas pressure for successful operation; has the ability to lift trapped liquid for gravity transportation to a drain and eliminate an open gas path to atmosphere.

SUMMARY OF THE INVENTION

Accordingly the present invention relates to a drip trap for separating a liquid from a gas, comprising casing means, inlet means in the top end of said casing means for introducing a liquid-containing gas into said casing means; downspout means on said inlet means extending downwardly in said casing means and downspout means for discharging liquid from said casing means; and valve means connected to said inlet means and said outlet means; in one position said valve means permitting the entry of liquid-containing gas into said casing means while preventing the escape of liquid through said outlet means; and in a second position said valve means closing said inlet means while opening said outlet means to permit the discharge of liquid under pressure from said gas after the liquid has risen to a level above the lower end of said downspout means.

BRIEF DESCRIPTION OF THE DRAWING(S)

This invention will now be described in detail with reference to the accompanying drawing, the single FIGURE of which is a partly sectioned side elevation view of a preferred embodiment of the invention.

DESCRIPTION OF THE PREFERRED EMBODIMENT

With reference to the drawing, a drip trap in accordance with the invention includes a tubular casing 1, with an open end 2 and a closed bottom end 3. A radially extending flange 4 is provided on the top end 2 of the casing for supporting an annular gasket 5 and a cover 6. The cover 6 is secured to the casing 1 by bolts 7 and nuts 8. The cover 6 enables inspection of the interior of the casing 1. The flanged top end 2 of the casing 1 also permits the lengthening of the casing by the addition of flanged tubular pipe sections (not shown).

The casing 1 is mounted on a stand defined by a pipe section 10 with an open top end 11 welded to the bottom end 3 of the casing, and a circular bottom plate 12 supporting the pipe section 10 and the casing 1. A drain outlet 13 extends downwardly from the centre of the bottom 3 of the casing 1 and outwardly through the pipe section 10. The outlet 13 is normally closed by a cap 14.

Gas containing a liquid is introduced into the casing 1 through a pipe 15, a four-way two port 90 degree turn valve 16, and an inlet duct 17. A downspout 18 is provided on the inner end of the inlet duct 17. Liquid is discharged from the casing 1 through an outlet duct 20, the valve 16 and a drain pipe 21. The outlet duct 20 also incldes downspout 22 on the inner end thereof. The valve 16 is manually operated by a lever 24. The valve 16 can be rotated 90 degrees to connect either pipe 15 to the inlet duct 17 or the outlet duct 20 to the drain pipe 21.

In operation a pressurized gas/liquid mixture enters the casing 1 through the pipe 15, the valve 16 and the inlet duct 17. The mixture is essentially two phase, with the gas and liquid separate. There is a slight, insignificant breakout of gases entrained in the liquid. As liquid enters the casing 1 the gas enters and leaves the casing freely until the liquid reaches the height of the downspout 18. Any gas in the casing 1 is trapped above the liquid as the liquid starts to fill the inlet duct 17 back to the valve 16. The trapped gas provides the driving pressure for draining the liquid from the casing 1. When the valve lever 24 is rotated 90 degrees the inlet duct 17 is closed to the pipe 15 and the outlet duct 20 is opened to the drain pipe 21. The liquid is pushed out of the casing 1 through the duct 20 by the gas trapped in the casing. Only a small amount of gas is used as the driving medium for forcing liquid from the casing 1. Thus gas cannot short circuit through the casing 1 and discharge through the drain pipe 21.

What I claim:

1. A drip trap for separating a liquid from a gas, comprising casing means; inlet means in the top end of said casing means for introducing a liquid-containing gas into said means; downspout means on said inlet means extending downwardly in said casing means; downspout means and outlet means for discharging liquid from the bottom end of said casing means; and valve means connected to said inlet means and said outlet means, in one position said valve means permitting the entry of liquid-containing gas into said casing means while preventing the escape of liquid through said outlet means; and in a second position said valve means closing said inlet means while opening said outlet means to permit the discharge of liquid under pressure from said gas after the liquid has risen to a level above the lower end of said downspout means.

2. A drip trap according to claim 1 wherein said valve means is a four-way two port valve for alternately connecting said inlet means to a source of liquid-containing gas and the outlet means to a drain.

3. A drip trap according to claim 1 including a normally closed drain outlet in the bottom of said casing means beneath said outlet means.

* * * * *